US008854964B2

(12) United States Patent
Liu

(10) Patent No.: US 8,854,964 B2
(45) Date of Patent: Oct. 7, 2014

(54) METHOD AND APPARATUS FOR DETERMINING A TRANSPORT BIT RATE FOR A MULTIPROGRAM TRANSPORT STREAM

(75) Inventor: Vincent C. Liu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1426 days.

(21) Appl. No.: 11/956,663

(22) Filed: Dec. 14, 2007

(65) Prior Publication Data

US 2009/0154546 A1 Jun. 18, 2009

(51) Int. Cl.
*H04J 3/14* (2006.01)
*H04N 7/26* (2006.01)
*H04N 11/02* (2006.01)
*H04N 21/2365* (2011.01)
*H04N 21/434* (2011.01)
*H04N 21/442* (2011.01)
*H04N 21/43* (2011.01)

(52) U.S. Cl.
CPC ....... *H04N 21/2365* (2013.01); *H04N 21/4347* (2013.01); *H04N 21/44209* (2013.01); *H04N 21/4305* (2013.01)
USPC ........... 370/234; 370/253; 370/465; 370/516; 375/240.02; 375/240.27; 375/371; 348/390.1; 348/497

(58) Field of Classification Search
USPC ............. 375/240.01, 240.25, 240.02, 240.27, 375/371; 370/234, 253, 465, 516; 348/390.1, 497
See application file for complete search history.

(56) References Cited

U.S. PATENT DOCUMENTS

| | | | | |
|---|---|---|---|---|
| 5,640,388 A * | 6/1997 | Woodhead et al. | ........... | 370/468 |
| 5,828,414 A * | 10/1998 | Perkins et al. | ........... | 375/240.01 |
| 6,996,129 B2 * | 2/2006 | Krause et al. | ................ | 370/487 |
| 7,031,306 B2 * | 4/2006 | Amaral et al. | ................ | 370/389 |
| 7,321,565 B2 * | 1/2008 | Todd et al. | ..................... | 370/253 |
| 7,397,825 B2 * | 7/2008 | Woodward et al. | ........... | 370/516 |
| 7,499,446 B1 * | 3/2009 | Gou et al. | ..................... | 370/389 |
| 7,778,173 B2 * | 8/2010 | Tse | ........................... | 370/230.1 |
| 7,804,856 B2 * | 9/2010 | Krause et al. | ................ | 370/486 |
| 7,885,189 B2 * | 2/2011 | Krause et al. | ................ | 370/232 |
| 8,171,166 B1 * | 5/2012 | Eshet | ........................... | 709/246 |
| 8,737,424 B2 * | 5/2014 | Hartung | ....................... | 370/454 |
| 2004/0073939 A1 * | 4/2004 | Ayyagari | ...................... | 725/110 |
| 2005/0177643 A1 * | 8/2005 | Xu | .................................. | 709/231 |
| 2005/0238061 A1 * | 10/2005 | Woodward | .................... | 370/516 |
| 2005/0262537 A1 * | 11/2005 | Baran et al. | .................... | 725/88 |
| 2006/0007960 A1 * | 1/2006 | Liu et al. | ....................... | 370/503 |
| 2006/0088052 A1 * | 4/2006 | Sauser et al. | .................. | 370/466 |
| 2006/0146815 A1 * | 7/2006 | Tse | ........................... | 370/389 |
| 2006/0165011 A1 * | 7/2006 | Starr et al. | .................... | 370/252 |
| 2006/0168296 A1 * | 7/2006 | Kim et al. | ..................... | 709/231 |

(Continued)

*Primary Examiner* — Alpus H Hsu
(74) *Attorney, Agent, or Firm* — Lori Anne D. Swanson

(57) ABSTRACT

Method and apparatus for determining a transport bit rate for a multiprogram transport stream (MPTS) is described. In one example, a plurality of transport bit rates is computed for a respective plurality of programs in the MPTS. A highest transport bit rate and a lowest transport bit rate are selected from the plurality of transport bit rates. An average transport bit rate is computed from the highest transport bit rate and the lowest transport bit rate. The average transport bit rate is provided as an initial transport bit rate for the MPTS. Jitter in the MPTS may be compensated using the initial transport bit rate.

17 Claims, 2 Drawing Sheets

(56) References Cited

U.S. PATENT DOCUMENTS

| | | |
|---|---|---|
| 2006/0184670 A1* | 8/2006 | Beeson et al. ............... 709/224 |
| 2006/0262813 A1* | 11/2006 | Dygert ......................... 370/477 |
| 2007/0091917 A1* | 4/2007 | Schoenblum ................ 370/464 |
| 2007/0115969 A1* | 5/2007 | Isnardi ......................... 370/389 |
| 2007/0140358 A1* | 6/2007 | Schwartz et al. ........ 375/240.26 |
| 2009/0007201 A1* | 1/2009 | Eerenberg et al. ............ 725/104 |
| 2009/0154347 A1* | 6/2009 | Mamidwar et al. .......... 370/229 |
| 2010/0268835 A1* | 10/2010 | Hartung ....................... 709/231 |

* cited by examiner ents that are common to the figures.
METHOD AND APPARATUS FOR DETERMINING A TRANSPORT BIT RATE FOR A MULTIPROGRAM TRANSPORT STREAM

BACKGROUND OF THE INVENTION

1. Field of the Invention

The present invention relates to processing digital video streams and, more particularly, to a method and apparatus for determining a transport bit rate for a multiprogram transport stream (MPTS).

2. Description of the Background Art

Commonly, transport streams carrying compressed digital content (e.g., audio/video/data) are transmitted from a source (e.g., uplink or headend) towards receiving equipment over a packet-based network (e.g., Ethernet network). Due to variable transmission delays through the network, individual transport stream packets suffer from variable delays at the receiving equipment, which is referred to as "jitter." Jitter deleteriously affects the processing and decoding of the content carried by the transport stream packets. As such, the receiving equipment must compensate for the jitter before distributing the transport stream packets to user terminals.

Typically, multiple content streams ("programs") are multiplexed to form a single transport stream, which is then transmitted towards the receiving equipment. For example, several MPEG (Moving Picture Experts Group) programs, such as MPEG-2 programs, may be multiplexed to form a multi-program transport stream (MPTS). One technique for de-jittering an MPTS is to buffer the received packets and then send them out at a steady output rate. This de-jittering technique requires the original transmission rate ("bit rate") of the MPTS. However, upon initially receiving an MPTS, an accurate determination of the original bit rate of the MPTS is often difficult to obtain within a short period of time. This is due to the jitter introduced by the network.

Moreover, an MPTS often contains programs having different time bases (known as program clock references (PCRs)). Within the MPTS, each time base may vary by up to a particular tolerance level (e.g., ±30 parts per million (ppm) for MPEG-2). If the initial bit rate selected for the de-jittering process is in error from the actual bit rate, some of the outlying PCR time bases may exceed the specified tolerance after the de-jittering process. Accordingly, there exists a need in the art for a method and apparatus for determining an initial transport stream bit rate for use in de-jittering an MPTS such that no PCR time base within the MPTS exceeds a specified tolerance.

SUMMARY OF THE INVENTION

Method and apparatus for determining a transport bit rate for a multiprogram transport stream (MPTS) is described. In one embodiment, a plurality of transport bit rates is computed for a respective plurality of programs in the MPTS. A highest transport bit rate and a lowest transport bit rate are selected from the plurality of transport bit rates. An average transport bit rate is computed from the highest transport bit rate and the lowest transport bit rate. The average transport bit rate is provided as an initial transport bit rate for the MPTS. Jitter in the MPTS may be compensated using the initial transport bit rate.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
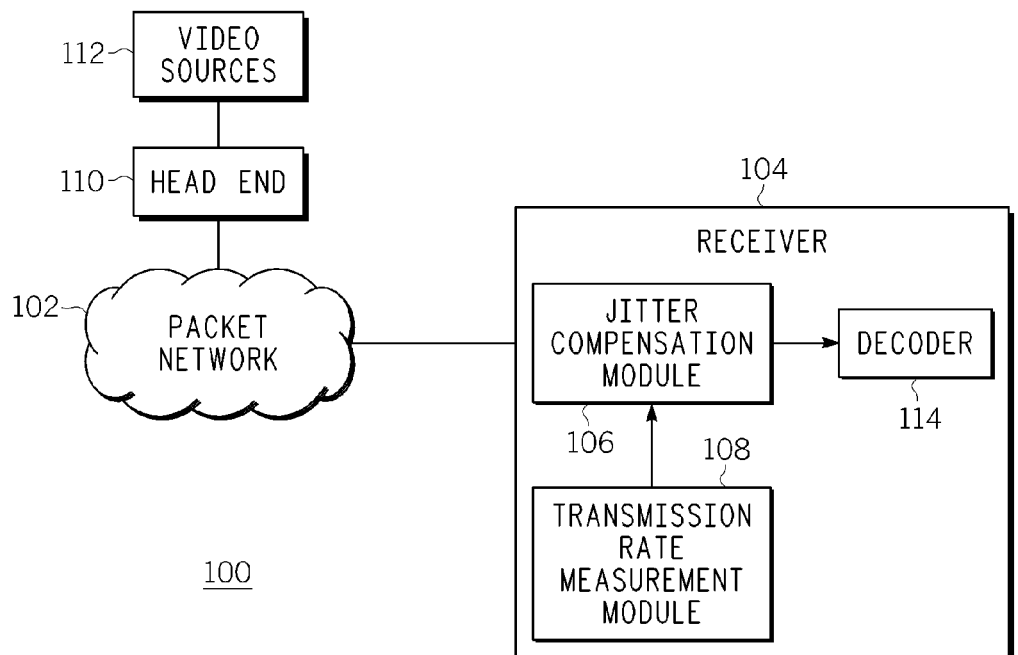
FIG. 1 is a block diagram depicting an exemplary embodiment of a video distribution system in accordance with one or more aspects of the invention.

FIG. 1 is a block diagram depicting an exemplary embodiment of a video distribution system 100 in accordance with one or more aspects of the invention. The system 100 includes a packet network 102, a headend 110, and a receiver 104. The headend 110 is configured to distribute multiprogram transport streams (MPTSs) to the receiver 104 over the packet network 102. Each MPTS carries multiple video streams, which may be encoded using various coding techniques that comply with well known standards developed by the Moving Picture Experts Group (MPEG) and International Telecommunications Union (ITU-T), such as MPEG-1, MPEG-2, MPEG-4, H.261, H.263, H.264 and like standards. For purposes of clarity by example, the invention is described with respect to MPEG-2 transport streams, the format of which is well known in the art. The headend 110 may form the MPTSs using video data received from the video sources 112.

The packet network 102 comprises a packet-based communication network, such as an Ethernet network, asynchronous transfer mode (ATM), frame-relay, or like type packet network known in the art. The receiver 104 is configured to process one or more MPTSs distributed by the headend 110. The receiver 104 includes a jitter compensation module 106, a transmission rate measurement module 108, and a decoder 114. The jitter compensation module 106 is configured to remove network jitter from each MPTS received over the packet network 102. In one embodiment, the jitter compensation module 106 de-jitters an MPTS by buffering the packets received from the packet network 102 and providing them to the decoder 114 at a steady output rate. The jitter compensation module 106 requires the transmission rate of the MPTS to perform the de-jittering process. The transmission rate measurement module 108 is configured to determine the transmission rate of the MPTS and provide the transmission rate to the jitter compensation module 106.

The transmission rate measurement module 108 operates as follows: For each program in the MPTS, a transport bit rate is computed based on two or more program clock reference (PCR) values extracted from the program. For a given program in an MPTS, the transport bit rate can be computed as:

$$\text{transport rate} = \frac{\text{number } MPTS \text{ packets between two } PCR \text{ values} * 188 * 8}{\text{difference in } PCR \text{ values}/27{,}000{,}000}. \quad \text{Eq. 1}$$

The above equation assumes each MPEG transport stream packet includes 188 bytes, each byte includes 8 bits, and the MPEG system clock is 27 MHz. The PCR values can be extracted from the programs in parallel.

An average transport rate for a given program in the MPTS may be computed using pairs of PCR values extracted from the program. In this manner, transport bit rates for all of the programs in the MPTS are computed. The transmission rate measurement module 108 then selects the highest and the lowest transport bit rates from the transport bit rates for all of the programs in the MPTS. The transmission rate measurement module 108 determines the initial transport bit rate for the MPTS by averaging the selected highest and lowest transport bit rates. The initial transport bit rate can then be used by the jitter compensation module 106 for de-jittering the MPTS.

Operation of the transmission rate measurement module 108 may be understood with reference to the following example. For an MPTS that is composed of broadcast quality television services, the PCR clock frequency of each program has only a small deviation from the standard 27 MHz clock, typically within ±5 parts per million (ppm). Such a PCR clock will only deviate from the standard by ±137 Hz. If an MPTS contains a program that has been produced by an encoder with wider PCR clock deviations (e.g., ±25 ppm), then it is important to ensure that in the de-jittered transport stream, each PCR clock must not exceed the MPEG tolerance of ±30 ppm. Consider the following MPTS with an original transport rate of 38.81 Megabits per section (Mbps) and 15 programs, each having its own PCR:

(a) Programs 1 through 12 have PCR clocks that are 5 ppm slower than the standard;
(b) Programs 13 through 14 have PCR clocks that are 3 ppm slower than the standard; and
(c) Program 15 has a PCR clock that is 28 ppm faster than the standard.

The advantage provided by the invention can be understood with reference to the following: The transport rate of an MPTS may be computed by counting the number of MPEG transport packets received within a fixed period of time (e.g., 1 second) and computing the bit rate of the transport stream by:

$$\text{transport rate} = \frac{\text{number of packets received} * 188 * 8}{\text{time period in seconds}} \quad \text{Eq. 2}$$

However, the transport rate calculated using this technique may have an uncertainty, since network jitter directly affects the arrival time of each packet. For example, in a network with a maximum jitter of 1 millisecond (ms), the packets at the beginning of a 1 second measurement time period may be delayed by 1 ms, thus creating a void at the beginning of the measurement period. This causes the transport rate calculation to be lowered by 1 ms/1 second=0.1% or one part per thousand. While the accuracy may be improved by using a measuring period longer than one second, this comes at the expense of a longer acquisition time. With respect to the above MPTS example, the transport rate calculated cannot be more than 2 ppm faster than the original transport rate of 38.81 Mbps, nor should it be more than 25 ppm slower than the original rate which the computed rate from the above example violates. If the computed rate is faster by more than 2 ppm (i.e., faster than 38.810078), then the PCR packets belonging to each program are sent out faster by the same margin of greater than 2 ppm, which increases each PCR clock's frequency by that amount. The PCR clock for program 15 will run faster than 30 ppm, thus violating the specification for MPEG-2 transport streams. On the other hand, if the computed rate is slower by more than 25 ppm (i.e. slower than 38.809029 Mbits/sec) then the PCR packets are sent out at a slower rate which decreases each PCR clock's frequency. The PCR clocks for programs 1 through 12 will run slower by more than 30 ppm from 27 MHz.

The transport rate of an MPTS may also be computed by using the transport rate of a single program of the MPTS as the initial transport rate for the MPTS. However, the rate computed in this manner is affected by the frequency deviation inherent in the chosen PCR clock. For example, if the PCR clock of the chosen program is running 3 ppm slower than the standard 27 MHz frequency, then the computed rate will be 3 ppm larger. Thus, if a PCR clock from programs 13 or 14 is chosen by chance, the resulting transport rate measurement will be 3 ppm faster than 38.81 Mbps. This is due to the fact that the PCR clock is running 3 ppm slower, which causes the difference in value between consecutive time stamps to be smaller than nominal.

The transport rate of an MPTS may be computed by averaging all of the transport rates of the programs or some transport rates randomly selected. By averaging the calculated rates from all PCR clocks, the resultant transport rate will be around 2.5 ppm faster than 38.81 Mbps (the resulting PCR clock rates are: 2.5 ppm slower than 27 MHz for programs 1 through 12; 0.5 ppm slow for programs 13 and 14; and 30.5 ppm faster than 27 MHz for program 15). This is still short of the MPEG-2 requirements.

However, if the transport rate of the exemplary MPTS described above is computed by the transport rate measurement module 108, MPEG-2 requirements are satisfied. The highest transport rate is given by the program with the slowest PCR clock (e.g., programs 1 through 12). Any of these PCR clocks will yield a transport rate of 38.810194 Mbps, i.e., 5 ppm faster than the original transport rate of 38.81 Mbps. The lowest transport rate is given by program 15, which has the fastest PCR clock. This produces a transport rate of 38.808913 Mbps. The average of the highest and lowest transport rates for the MPTS is 38.809554 Mbps, which is 11.5 ppm lower than the actual rate of 38.81 Mbps. The lower rate compensates for the faster PCR clock in program 15, which now appears as 28 ppm−11.5 ppm=16.5 ppm faster. On the other hand, the clocks belonging to programs 1 through 12 will appear as 5 ppm+11.5 ppm=16.5 ppm slower. However, the overall effect is that all PCR clocks for all the programs 1 through 15 are now within the MPEG tolerance of ±30 ppm.

For the general case of an MPTS containing a fastest PCR clock at x ppm and a slowest PCR clock at y ppm, where x and y are both bounded by ±30 ppm, (the sign of each variable will be positive if the clock associated with it is faster than 27 MHz, and negative if it is slower than 27 MHz.) The transport rate calculated from the fastest clock is equal to (original rate)*(1−x*0.000001), while the slowest clock leads to a rate of (original rate)*(1−y*0.000001). The average of the two bit rates is (original rate)*(1−(x+y)*0.5*0.000001). This bit rate is offset from the true transport rate by −(x+y)*0.5 ppm. Notice that the sign reversal is due to the fact that if (x+y) was positive, i.e., the average of the fastest and the slowest PCR clocks was faster than 27 MHz, then the average transport rate calculated will be slower than the true original rate. Using the average of the highest and lowest transport rates as the initial transport rate for the de-jittering process, the fastest PCR clock now appears to have a frequency deviation of x−(x+y)*0.5 or (x−y)*0.5 ppm. Since both x and y are bounded by ±30 ppm, (x−y)*0.5 is also bounded by ±30 ppm. The slowest PCR clock now appears to have a frequency deviation of y−(x+y)*0.5 or (y−x)*0.5 ppm, which is also bounded by ±30 ppm.

The initial transport rate determined by the transmission rate measurement module 108 does not match the original rate at which the MPTS is being transmitted through the network 102 and received by the receiver 104. If left unadjusted, an eventual buffer overflow or underflow will occur. However, once the de-jittering process is running, there is ample time to compute the true bit-rate of the transport stream by counting the number of MPEG transport packets received within a fixed period of time and computing the resulting bit rate of the transport stream using Equation 2. The initial rate at the output of the jitter compensation module 106 can be adjusted slowly towards the true MPTS rate (no more than 10 ppm per each hour of adjustment to comply with MPEG system requirements). Since this rate adjustment process moves slowly, a coarse transport rate can first be computed by the transport rate measurement module 108, which would be used to start the adjustment process. The transport rate measurement module 108 then continuously refines the computed transport rate for the MPTS as time progresses.

Figure 2:
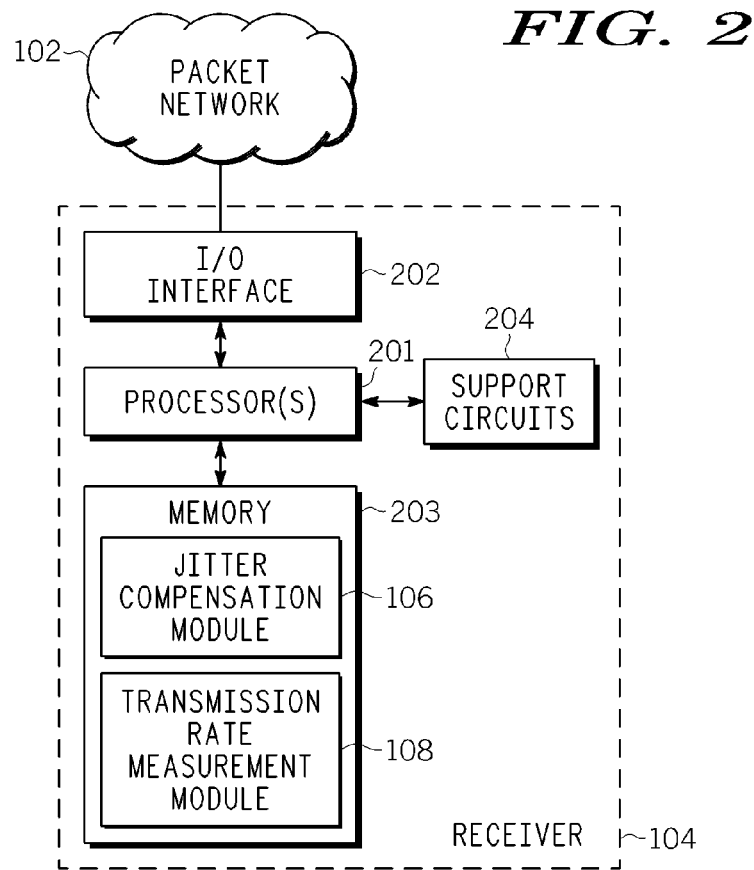
FIG. 2 is a block diagram depicting another exemplary embodiment of the receiver in accordance with one or more aspects of the invention.

FIG. 2 is a block diagram depicting another exemplary embodiment of the receiver 104 in accordance with one or more aspects of the invention. The receiver 104 includes one or more processors 201, a memory 203, various support circuits 204, and an I/O interface 202. The processor(s) 201 may be any type of microprocessor known in the art. The support circuits 204 for the processor(s) 201 include conventional cache, power supplies, clock circuits, data registers, I/O interfaces, and the like. The I/O interface 202 may be directly coupled to the memory 203 or coupled through the processor(s) 201. The I/O interface 202 is coupled to the network 102 for receiving MPTSs.

The memory 203 stores processor-executable instructions and/or data that may be executed by and/or used by the processor(s) 201 as described further below. These processor-executable instructions may comprise hardware, firmware, software, and the like, or some combination thereof. Modules having processor-executable instructions that are stored in the memory 203 include jitter compensation module 106 and transmission rate measurement module 108. The memory 203 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs.

Figure 3:
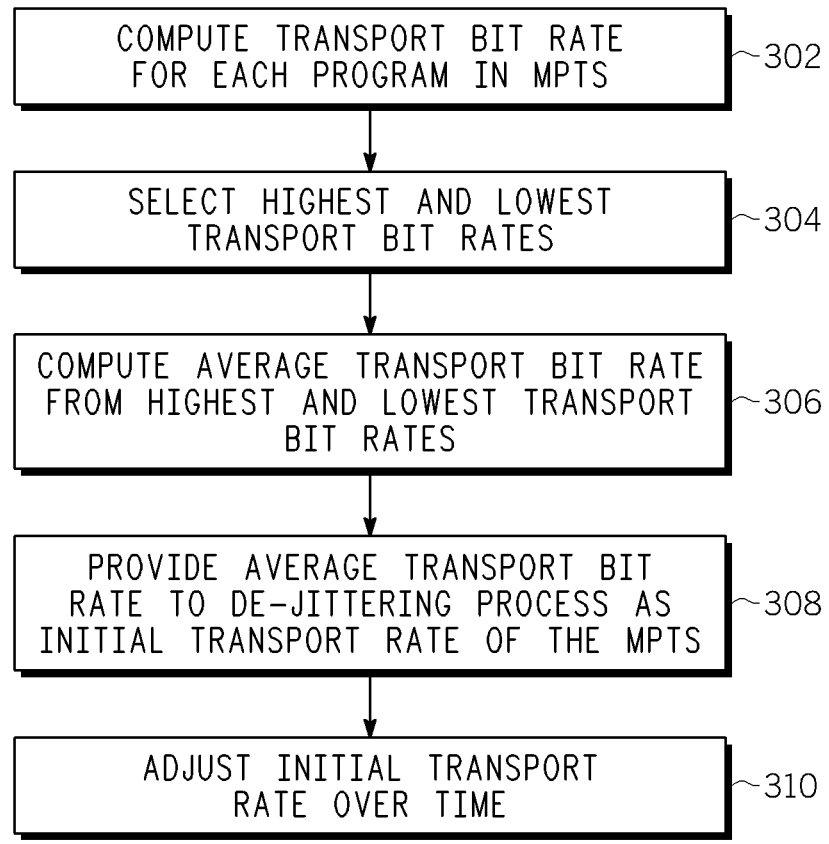
FIG. 3 is a flow diagram depicting an exemplary embodiment of a method for determining a bit rate of an MPTS in accordance with one or more aspects of the invention.

FIG. 3 is a flow diagram depicting an exemplary embodiment of a method 300 for determining a bit rate of an MPTS in accordance with one or more aspects of the invention. The method 300 begins at step 302, where a transport bit rate is computed for each program in the MPTS. The transport bit rate for each program may be computed using two or more PCR values extracted from each program. At step 304, the highest and lowest transport bit rates computed at step 302 are selected. At step 306, an average transport bit rate is computed by averaging the highest and the lowest transport bit rates. At step 308, the average transport bit rate is provided to a de-jittering process as an initial transport bit rate for the MPTS. At step 310, the initial transport bit rate for the MPTS is continuously adjusted. For example, the initial transport bit rate can be adjusted towards a transport bit rate computed using Equation 2 over a given duration.

Method and apparatus for determining a transport bit rate of an MPTS has been described. The transport bit rate can be used in a process for de-jittering the MPTS after receipt through a packet network. The bit-rate computation method of the invention is able to maintain the output MPTS of the de-jittering process within the ±30 ppm bound for all PCR clocks belonging to the MPTS. To calculate the proposed transport bit rate, only two PCR values need be extracted from each program. In the worst case, there may be a 100 ms wait for the first PCR value and another 100 ms wait for the second PCR value. Since each program can be processed in parallel, the average of the highest and lowest bit rates can be determined within 200 ms. Once the initial transport bit rate is determined, the de-jittering process can be adjusted slowly so that its bit rate will eventually match the true transport rate at which the MPTS was transmitted through the network 102.

While the foregoing is directed to illustrative embodiments of the present invention, other and further embodiments of the invention may be devised without departing from the basic scope thereof, and the scope thereof is determined by the claims that follow.

What is claimed is:

1. A method of dejittering a multiprogram transport stream (MPTS), the method comprising:
 determining the multiprogram transport stream (MPTS) initial transport bit rate for dejittering a multiprogram transport stream (MPTS), wherein the initial transport bit rate is determined by:
  computing program transport bit rates for each of a plurality of programs in the multiprogram transport stream (MPTS) using a processor by performing the following:
   extracting a pair of program clock reference (PCR) values from the program using the processor;
   determining a number of packets in the multiprogram transport stream (MPTS) between the pair of PCR values using the processor;
   determining a number of bits in the number of packets using the processor;
   dividing the number of bits by a difference in the pair of PCR values using the processor;
  selecting a highest program transport bit rate from the transport bit rates for the plurality of programs in the multiprogram transport stream (MPTS) and a lowest program transport bit rate from program transport bit rates for the plurality of programs in the multiprogram transport stream (MPTS) using the processor;
  computing the multiprogram transport stream (MPTS) initial transport bit rate by averaging the highest transport bit rate and the lowest transport bit rate using the processor; and
 providing to a de-jittering process for the multiprogram transport stream (MPTS) the initial transport bit rate for the multiprogram transport stream (MPTS) for dejittering the multiprogram transport stream (MPTS).

2. The method of claim 1, further comprising:
 compensating for jitter in the MPTS using the initial transport bit rate.

3. The method of claim 2, further comprising:
 adjusting the initial transport bit rate over time during the compensation of the jitter in the MPTS.

4. The method of claim 3, wherein the step of adjusting comprises:
 computing an updated transport bit rate by counting a number of packets in the MPTS received within a period of time and dividing a number of bits in the number of packets by the period of time in seconds.

5. The method of claim 1, wherein the MPTS comprises a moving picture experts group (MPEG) transport stream.

6. The method of claim 1, wherein pairs of the PCR values are extracted from the plurality of programs in parallel.

7. An apparatus for dejittering a multiprogram transport stream (MPTS), comprising:
   a processor;
   a memory coupled to the processor, the memory including instructions that, when executed by the processor, cause the processor to:
      determine a multiprogram transport stream (MPTS) initial transport bit rate for dejittering the multiprogram transport stream (MPTS), wherein the initial transport bit rate is determined by:
         compute program transport bit rates for each of a plurality of programs in the multiprogram transport stream (MPTS) using a processor by performing the following:
            extracting a pair of program clock reference (PCR) values from the program using the processor;
            determining a number of packets in the multiprogram transport stream (MPTS) between the pair of PCR values using the processor;
            determining a number of bits in the number of packets using the processor;
            dividing the number of bits by a difference in the pair of PCR values using the processor;
         select a highest program transport bit rate from the transport bit rates for the plurality of programs in the multiprogram transport stream (MPTS) and a lowest program transport bit rate from program transport bit rates for the plurality of programs in the multiprogram transport stream (MPTS);
         compute the multiprogram transport stream (MPTS) initial transport bit rate by averaging the highest transport bit rate and the lowest transport bit rate using the processor; and
      provide to a de-jittering process for the MPTS the initial transport bit rate for the multiprogram transport stream (MPTS) for dejittering the multiprogram transport stream (MPTS).

8. The apparatus of claim 7, wherein the memory further includes instructions that, when executed by the processor, cause the processor to:
   compensate for jitter in the MPTS using the initial transport bit rate.

9. The apparatus of claim 8, wherein the memory further includes instructions that, when executed by the processor, cause the processor to:
   adjust the initial transport bit rate over time during the compensation of the jitter in the MPTS.

10. The apparatus of claim 9, wherein the instructions that, when executed by the processor, cause the processor to adjust the initial transport bit rate over time during the compensation of the jitter in the MPTS comprise instructions, that when executed by the processor, cause the processor to:
   compute an updated transport bit rate by counting a number of packets in the MPTS received within a period of time and dividing a number of bits in the number of packets by the period of time in seconds.

11. The apparatus of claim 7, wherein the MPTS comprises a moving picture experts group (MPEG) transport stream.

12. The apparatus of claim 7, wherein pairs of the PCR values are extracted from the plurality of programs in parallel.

13. A non-transitory computer readable medium having stored thereon instructions that when executed by a processor cause the processor to perform a method of dejittering a multiprogram transport stream (MPTS), comprising:
   determining a multiprogram transport stream (MPTS) initial transport bit rate for dejittering the multiprogram transport stream (MPTS), wherein the initial transport bit rate is determined by:
      computing program transport bit rates for each of a plurality of programs in the multiprogram transport stream (MPTS) using a processor by performing the following:
         extracting a pair of program clock reference (PCR) values from the program using the processor;
         determining a number of packets in the multiprogram transport stream (MPTS) between the pair of PCR values using the processor;
         determining a number of bits in the number of packets using the processor;
         dividing the number of bits by a difference in the pair of PCR values using the processor;
      selecting a highest program transport bit rate from the transport bit rates for the plurality of programs in the multiprogram transport stream (MPTS) and a lowest program transport bit rate from program transport bit rates for the plurality of programs in the multiprogram transport stream (MPTS) using the processor;
      computing the multiprogram transport stream (MPTS) initial transport bit rate by averaging the highest transport bit rate and the lowest transport bit rate using the processor; and
   providing to a de-jittering process for the multiprogram transport stream (MPTS) the initial transport bit rate for the multiprogram transport stream (MPTS) for dejittering the multiprogram transport stream (MPTS).

14. The non-transitory computer readable medium of claim 13, further comprising:
   compensating for jitter in the MPTS using the initial transport bit rate.

15. The non-transitory computer readable medium of claim 14, further comprising:
   adjusting the initial transport bit rate over time during the compensation of the jitter in the MPTS.

16. The non-transitory computer readable medium of claim 15, wherein the step of adjusting comprises:
   computing an updated transport bit rate by counting a number of packets in the MPTS received within a period of time and dividing a number of bits in the number of packets by the period of time in seconds.

17. The non-transitory computer readable medium of claim 13, wherein pairs of the PCR values are extracted from the plurality of programs in parallel.

* * * * *